Oct. 13, 1925.  
C. J. ROBINSON  
1,557,333  
MACHINE FOR REMOVING DUST AND PARTICLES FROM GRAIN OR GRANULAR SUBSTANCES  
Filed May 5, 1923     3 Sheets-Sheet 3
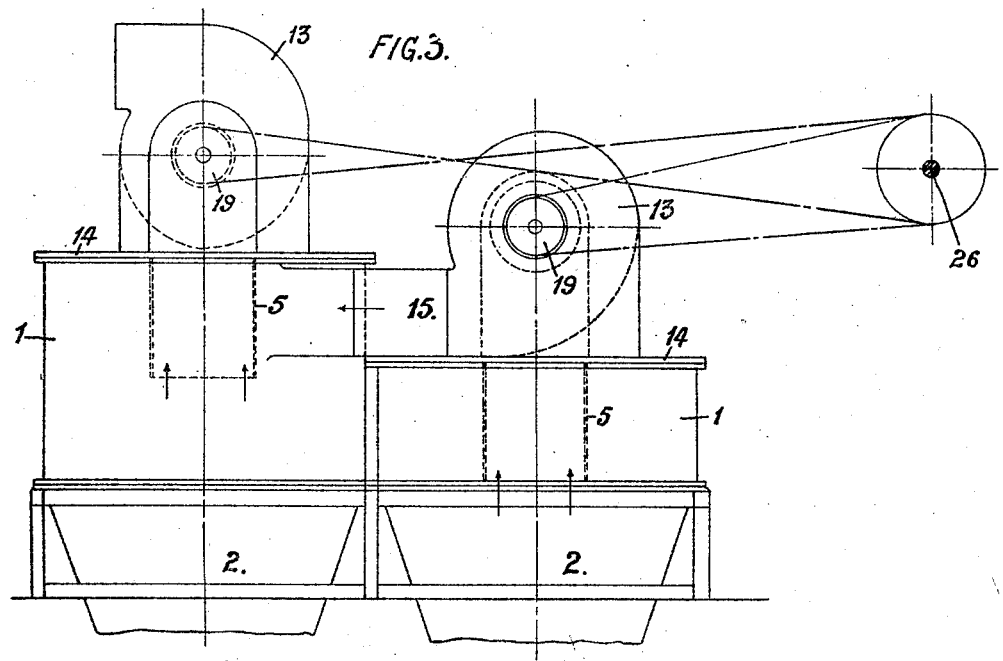
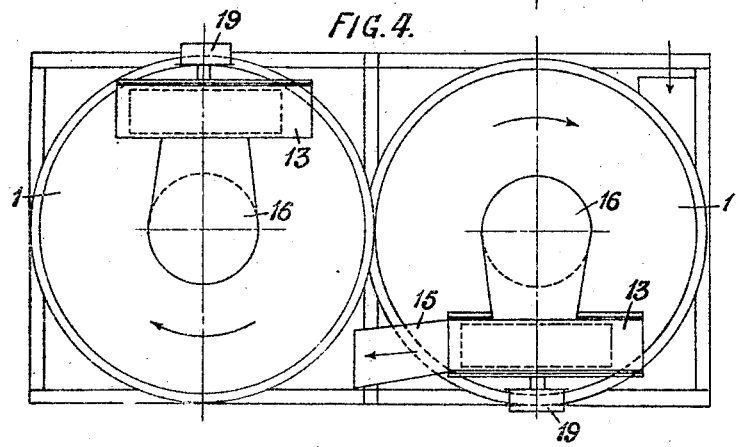
Inventor  
C. J. Robinson Patented Oct. 13, 1925.

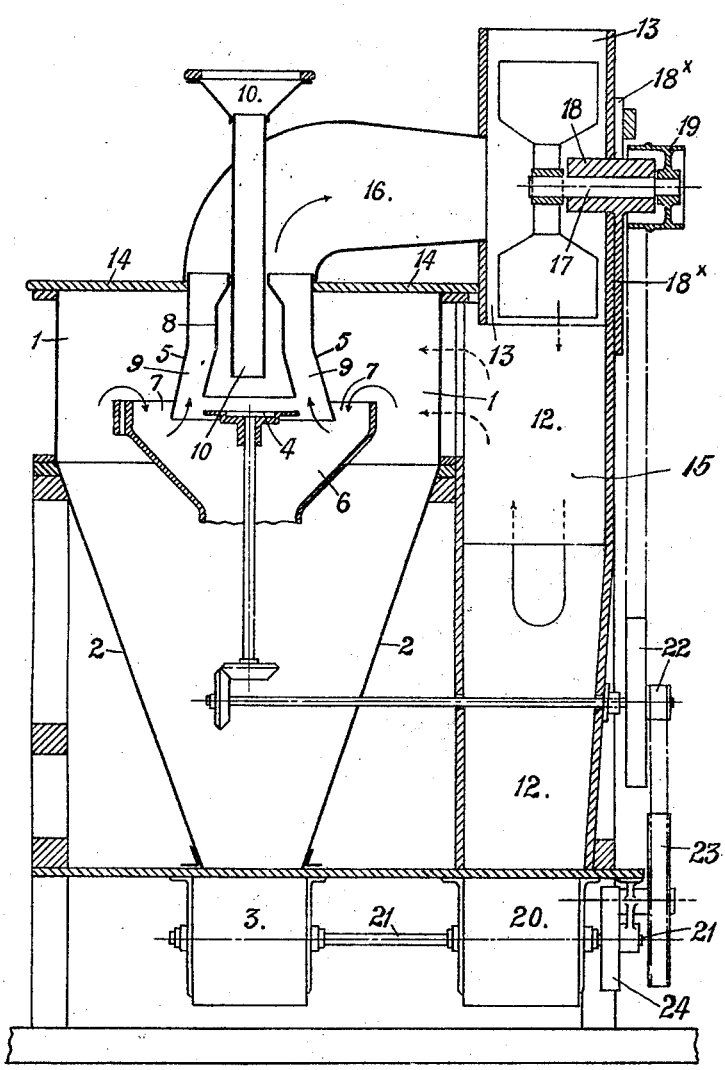

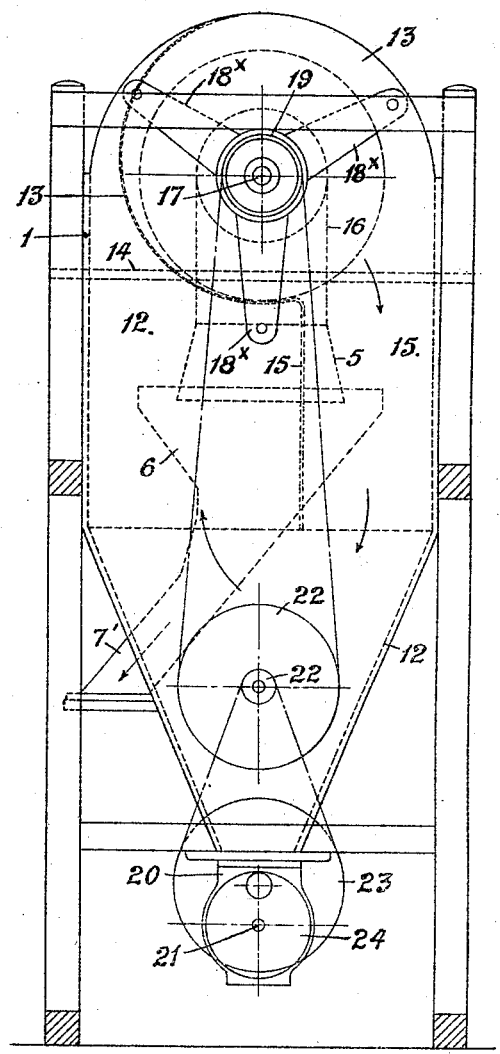

1,557,333

UNITED STATES PATENT OFFICE.

CHARLES JOHN ROBINSON, OF ROCHDALE, ENGLAND, ASSIGNOR TO THOMAS ROBINSON & SON LIMITED, OF ROCHDALE, ENGLAND, A LIMITED LIABILITY COMPANY OF ENGLAND.

MACHINE FOR REMOVING DUST AND PARTICLES FROM GRAIN OR GRANULAR SUBSTANCES.

Application filed May 5, 1923. Serial No. 636,996.

*To all whom it may concern:*

Be it known that I, CHARLES JOHN ROBINSON, a subject of the King of England, and residing at Rochdale, in the county of Lancaster, England, have invented Improvements in Machines for Removing Dust and Particles from Grain or Granular Substances, of which the following is a specification.

This invention has reference to machines for removing dust and other relatively light substances from air used for cleaning grain or granular substances in their natural or normal state, or in a more or less reduced or broken state, or air from industrial processes or the like, and it relates more particularly but not exclusively to that type of such machine wherein the removal of the dust and particles from the grain or broken material is effected by a current of air created by a fan, and in some cases operating in a closed cycle, the dust laden air being introduced into and passed through a separating vessel or vessels in which the dust or particles are separated, and fall down, and are subsequently removed; and the air ridded of its dust thereby, or largely so, is passed through a stream of grain or material, in some cases an annular stream produced by being thrown from a revolving table or disc, onto which it is delivered and operates on the grain and cleans the material and carries off the dust and light particles, and then is returned to the fan.

The chief objects of the present invention are to provide improvements in connection with apparatus of this kind by which the effects and advantages hereinafter explained, are accomplished.

In apparatus of the kind herein concerned, according to this invention, the fan or fans is or are disposed on the roof of the apparatus, its shaft or their shafts being horizontally disposed, and the dust laden air is carried from the centre of a dust centrifugal depositing chamber to the central eye of the fan by an elbow or angle trunk; and in the case where the dust laden air is delivered by the fan into a separating antichamber, called an "expansion chamber," wherein the coarser dust is separated and removed, the fan directly discharges the dust laden air downwards and into this upper part of the expansion chamber, and directs the dust towards the discharge valve below; and the velocity of the dust in the air causes the coarser particles to fall down and separate themselves freely; and after passing the lower lip of a depending diaphragm or trunk in the chamber, which directs the air downwards as above stated, the air flows round and upwards, and through an opening into the main separating chamber, tangentially.

The dust falls down from the separating cylinder of the apparatus, to the bottom of a conical portion of the apparatus, which is of a relatively steep angle, and in the case of a grain cleaning machine the air passes downwards through an annular space between the lip of a grain hopper or vessel, and the lip or an inverted cone, and then up through an annular space between the inverted cone and the periphery of the centrifuging disc, and through the stream of material flowing between them; and thence through a vertical part of a duct or trunk on the roof of the apparatus, and then through a horizontal portion of same to the eye of the fan, which is coincident horizontally, with the axis of the fan.

The trunk or duct from the top of the separator to the eye of the fan, is in the horizontal part tapered or conical, or has an inclined bottom, the object and effect of which is that the air passing along it removes any dust that deposits on it, and so the trunk or duct is prevented from getting clogged and stopped, that is, it is self cleaning.

In the case where there are two separating vessels operating in sequence, the air discharged from one centrifugal apparatus being delivered into another of a similar character, say with conical bottoms, a fan is used on each of the twin apparatus, and the axes of the two fans are horizontal, and the air is taken from the top of the centrifugal chamber of each apparatus (into which the air is delivered tangentially) the first fan delivering its air through a duct in a horizontal direction, directly and tangentially into the upper centrifugal chamber or portion of the second separator, while the fan of the second apparatus delivers its air into the atmosphere.

The invention is illustrated in the annexed drawings, in which Figure 1 is a sectional elevation, and Figure 2 an end view showing a single type of cleaning machine of the centrifugal type; and Figures 3 and 4 are side elevation and end view showing the invention applied to a twin type of centrifugal grain or granular material cleaning machine.

Referring in the first instance to Figures 1 and 2, 1 is the upper circular chamber into which the dust laden air is introduced tangentially in the usual way, and 2 is the conical bottom portion or hopper down which the dust separated from the air in chamber 1 falls, 3 being the rotary trapped valve through which the light dust is taken away from the machine, and air is excluded.

4 is the rotary table on to which the grain or material is delivered, and which is rotated at a high velocity by a shaft and gearing as usual, and the grain thrown off radially by the centrifugal action; and 5 is the curtain or tube extending round the periphery of the disc 4, on to which the grain is thrown by it, and by which it is deflected downwards. 6 is the hopper into which cleaned grain or material falls from the curtain 5, and from which it is conducted by the spout 7, which passes through the walls of the cone 2.

7 is the annular space through which the clean air passes into the hopper 6, and thence through the stream of falling grain or material, and the horizontal stream of centrifuged material between the disc 4 and the curtain 5.

8 is an inner annular curtain or tube, the lower part of which is about the diameter of the disc 4, which forms a slightly conical annular conduit 9, through which the air carrying the dust removed from the grain or material through which it has passed, flows; and 10 is the spout through which the grain or material is fed on to the disc 4.

12 is the expansion chamber into which the fan delivers the dust laden air; and the fan 13 is placed on the roof 14 of the apparatus, directly above the chamber 12, and it delivers the air through the discharge trunk 15 directly downwards into the tapered bottom of the chamber 12, the effect of this downward throwing of the dust laden air being that the solid particles or coarser dust are thrown downwards and therefore separate freely from the air; and the chamber 12 being of relatively larger area on the opposite side of the delivery trunk 16, the ascent of air through this portion of the chamber is relatively slow. From this chamber the air is delivered into the chamber 1, centrifugally, as usual.

The dust laden air passes from the annular conduit 9 into the trunk 16 on the roof 14, and passes thence through the horizontal portion of this trunk, centrally into the eye of the fan, the horizontal shaft or axis 17 of which is coincident with the trunk 16.

The bottom of the horizontal portion of the trunk 16 between this bend and the eye of the fan is inclined as shown, so that the current of air passing through it sweeps over this inclined uprising surface and prevents the deposit of dust upon it, and its becoming choked up by deposit, and thus is self cleansing; and in the case shown this incline is formed by making the horizontal portion of the conduit 16 tapered from the bend to the eye of the fan, and constricted in area towards the fan.

The fan shaft bearing 18, in the case shown, is carried on arms $18^x$, say cast on it, which are secured to the face of the fan case; and it is driven by a belt wheel 19 on the fan shaft 17; and the delivery discharge tapped valves 3 and 20 (the revolving parts of which are mounted on the common spindle 21) are driven from the belt wheel 19 through belts and other belt wheels 22, 23, and a gearing 24 consisting of a pinion and spur wheel on the shaft 21, these being driven at the slow speed required.

Referring to Figures 3 and 4, these show the invention applied to a twin cleaning and separating apparatus wherein the air is drawn into one part of the apparatus, namely, the chamber 1 of the first apparatus, being drawn in by the fan 13 on the top of this chamber and delivered by the fan through a conduit 15 tangentially into the chamber 1 of the second apparatus, whence it is drawn by and into the second fan 13 through the central conduit formed by the curtain 5, similarly as in the first apparatus, from which it is discharged into the air or suitable carrying off trunk. In both apparatus of this twin cleaner, the air is led from the chamber 1 by way of the conduit within the curtain 5, through a bent conduit 16, the horizontal portion of which is tapered as in the former case, so that the bottom portion of it is inclined upwards towards the eye of the fan and the trunk is self cleansing as above described. Thus, the first fan 13, by the delivery trunk 15, delivers the dust laden air from the first apparatus directly into the chamber 1 of the second cleaner.

The horizontal axes of the two fans 13 are parallel; and in the case shown the fans are disposed on different sides of the machine, but they may be on the same side, and the driving wheels 19 on the horizontal fan axles can be driven directly by driving belts from a horizontal driving shaft 26.

By the apparatus shown and described with reference to Figures 1 and 2, the floor space, and space generally occupied by a machine, for a given volume of material passed through it and cleaned, is rendered much less than that occupied by a machine of the same kind as hitherto constructed.

By this arrangement and construction of apparatus as above described, having the fan arranged with its axis horizontal, and the curved or bent intake trunk, a better and more rapid separation of dust and particles from the air is effected; and in the case of the machine having a separating anti-chamber, the separation and deposit of the coarse dust deposited in this anti-chamber is highly effective.

Further by this arrangement of fan or fans, it or they can be driven from any direct line shaft in the mill; and, as in the case shown in Figures 1 and 2, by using the double pulley on the horizontal fan shaft, the valves 3 and 20 can be driven direct from it through gearing such as described, whereby this gear is simplified and cheapened.

Also, the arrangement and construction provides ready access to the parts, and the construction is such that it requires less labour and time, and the cost of manufacture is lowered.

What is claimed is:—

1. A centrifugal machine for separating dust and other particles from air used for the cleaning of grain and other granular substances, comprising an inverted L-shaped suction duct, a fan operating vertically and transversely of the horizontal portion of said duct, a dust separating chamber to receive the air directly from the fan, said dust receiving chamber comprising an upper compartment to directly receive the air, and a second compartment in communication with the first mentioned compartment and of greater area than the first mentioned compartment to cause a comparatively retarded movement of the air in said second compartment.

2. A centrifugal machine for separating dust and other particles from air used for the cleaning of grain and other granular substances, comprising a suction fan, a suction duct leading thereto, a separating chamber provided with a partition extending longitudinally thereof and terminating above the bottom of said chamber, the air from the fan being delivered on one side of said partition and caused to flow beneath the partition and upwardly on the opposite side of said partition, the area of the chamber on said opposite side of said partition being greater than that in the chamber on that side of the partition directly receiving the air from the fan, that portion of the chamber in which the air flows upwardly being formed with a lateral outlet to direct the air for further separating purposes.

In testimony whereof I have signed my name to this specification.

CHARLES JOHN ROBINSON.